(12) United States Patent
Godina et al.

(10) Patent No.: US 8,746,648 B1
(45) Date of Patent: Jun. 10, 2014

(54) MODULAR LARGE LOAD VARIABLE SPRING AND METHOD FOR USING

(75) Inventors: Jerry Godina, Houston, TX (US); Hyder Husain, Houston, TX (US)

(73) Assignee: Piping Technology and Products, Inc., Houston ( * ) Notice: Subject to any disclaimer, the term of this patent is extended or adjusted under 35 U.S.C. 154(b) by 167 days.

(21) Appl. No.: 13/417,138

(22) Filed: Mar. 9, 2012

(51) Int. Cl.
*F16M 13/00* (2006.01)
(52) U.S. Cl.
USPC .......................................... 248/575; 248/618
(58) Field of Classification Search
USPC ......... 248/575, 576, 618, 619, 620, 621, 622, 248/623, 624, 625, 346.01, 346.04
See application file for complete search history.

(56) References Cited

U.S. PATENT DOCUMENTS

| | | | | |
|---|---|---|---|---|
| 4,251,045 A * | 2/1981 | Meyerle | ......................... | 248/619 |
| 4,619,532 A * | 10/1986 | Schmidt, III | .................. | 366/110 |
| 5,372,356 A * | 12/1994 | Luz et al. | ................... | 267/140.2 |
| 5,579,859 A * | 12/1996 | Quellhorst et al. | ......... | 180/89.13 |
| 6,418,862 B1 * | 7/2002 | Heil | ........................... | 108/57.12 |
| 7,931,257 B2 * | 4/2011 | VanDeRiet et al. | ........... | 267/142 |
| 8,282,063 B2 * | 10/2012 | Ou et al. | .................. | 248/346.04 |

* cited by examiner

*Primary Examiner* — Steven Marsh
(74) *Attorney, Agent, or Firm* — Plager Schack, LLP

(57) ABSTRACT

A method and apparatus for supporting heavy load is developed which consists of parallel spring sets in a M×N matrix, where M is the number of Modules and N is the number of spring sets in each module. Each spring set may be comprised of a single coil or multiple coils in series. Each module is pre-compressed to the design installation load employing hydraulic jacks working in parallel by a single pump.

10 Claims, 5 Drawing Sheets

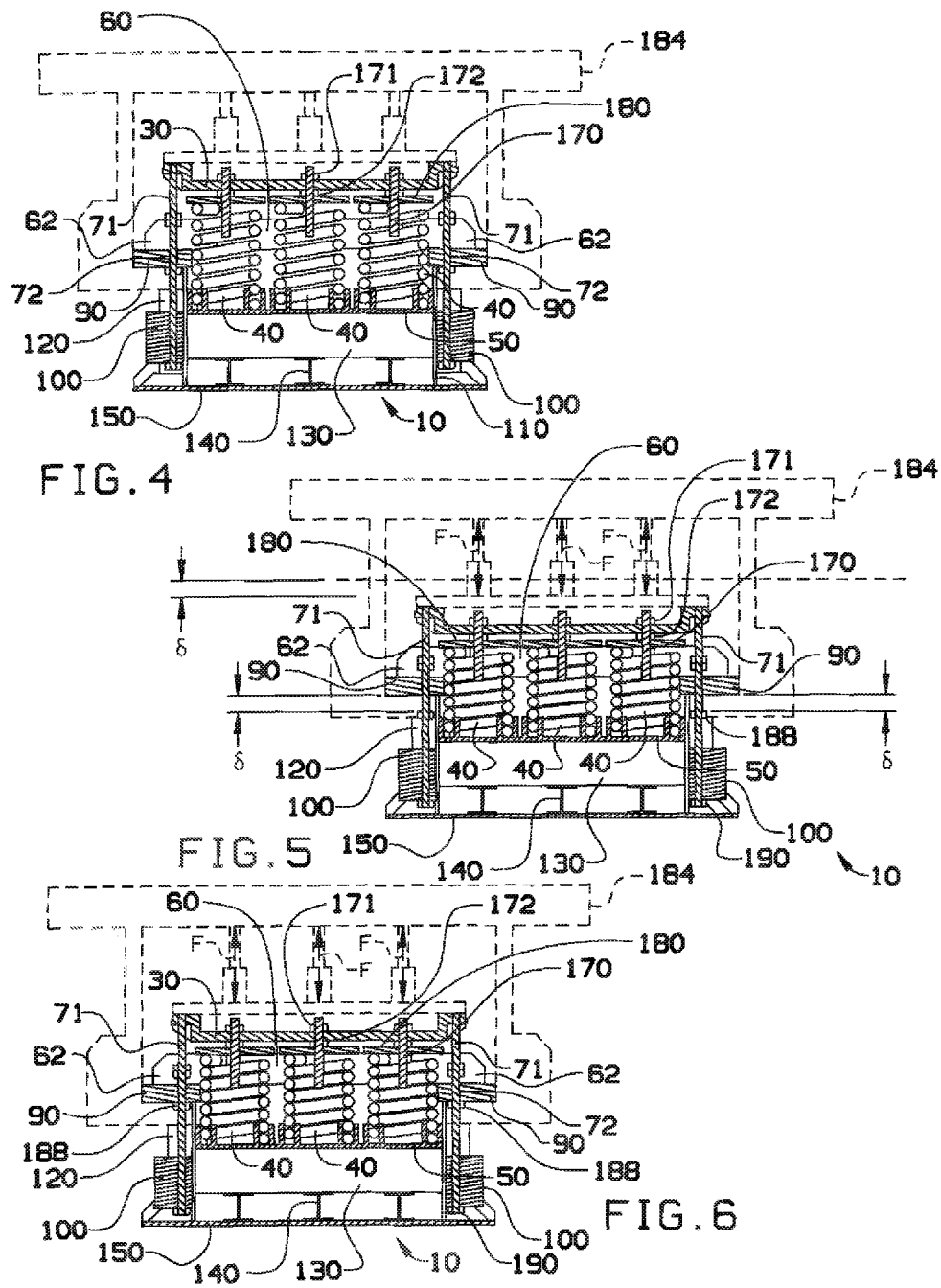

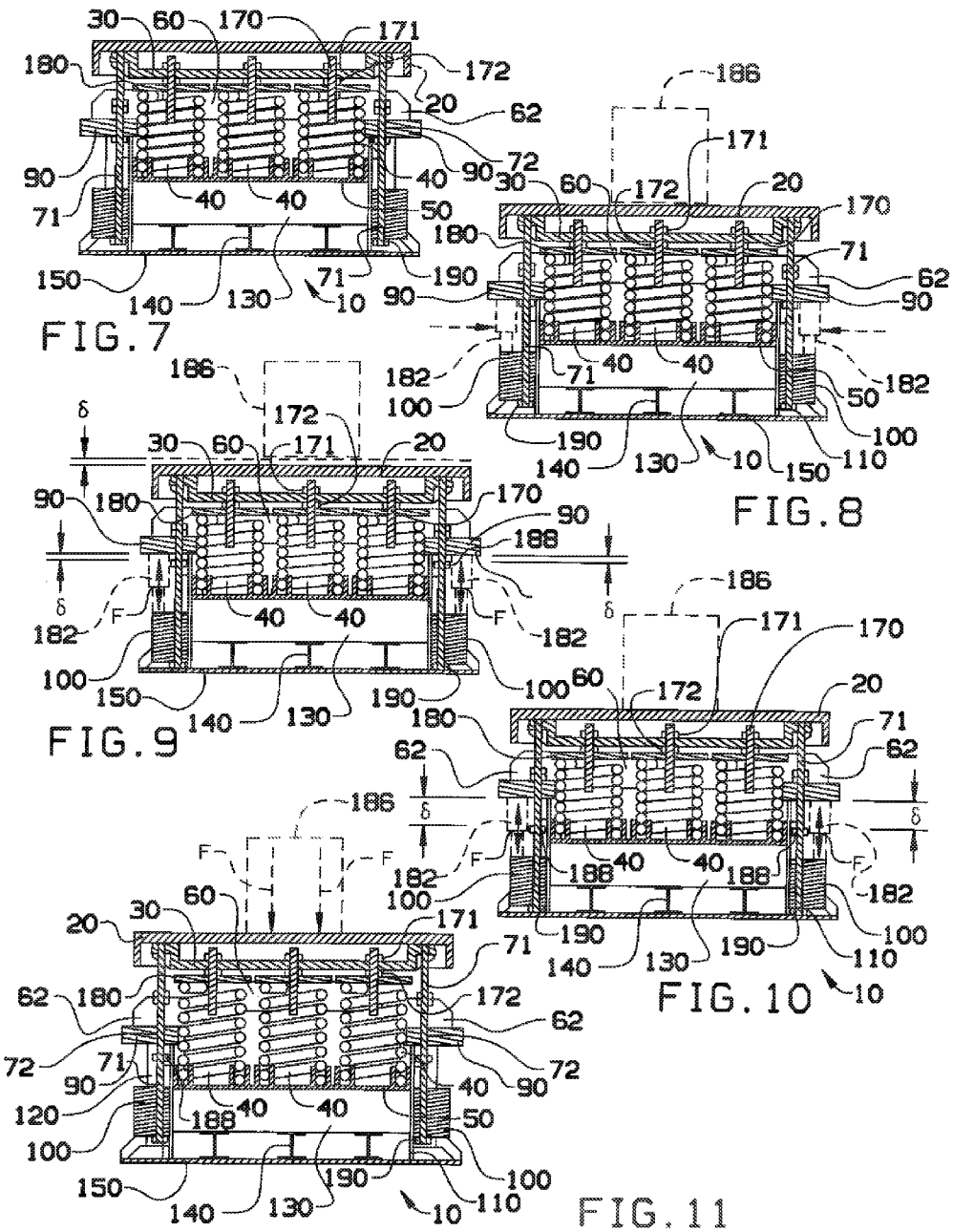

MODULAR LARGE LOAD VARIABLE SPRING AND METHOD FOR USING

BACKGROUND OF THE INVENTION

In the construction of various types of facilities, such as nuclear power plants, oil refineries, chemical plants, petrochemical plants, gas liquification plants and power generating plants, pipes and other equipments require some type of supports so that the thermal loads (expansion/contraction) of the system do not produce any extra stresses. One of the support system is a variable spring support wherein the deflection due to thermal loading of the system is accommodated by the compression/decompression of coil springs. For most cases variable spring supports are comprised of a single spring. As the load requirements increase, it becomes impractical to use a single spring to support these large loads. In such cases, several springs in parallel are configured to safely support large loads. This configuration of parallel springs we refer to as "large load variable spring" and hereafter we will denote these as "LLVS". LLVS may find use in, for example, chemical reactors, turbine inlet/outlets, pressure vessels, compressors, etc.

Various types of parallel spring configuration and apparatus for supporting loads have been proposed. For example, parallel springs in a row (FIG. 12), four parallel springs in a 2×2 matrix (FIG. 13), or multiple parallel springs in a circular configuration (FIG. 14). Up to a certain load capacity (approximately 100,000 lb), loading and unloading of such parallel spring configurations is possible via manually manipulating the heavy duty load bearing nuts. However, above this load range, the spring rate and the number of spring coils make it practically impossible to load/unload a LLVS manually. This led us to design and develop a multiple parallel spring system (LLVS) that is able to support heavy loads and permits loading and unloading via employment of hydraulic jacks activated by a single pump.

SUMMARY OF THE INVENTION

To attain the objective of supporting a large load, we designed, developed, and tested a parallel spring system (LLVS) that is comprised of:
(a) M number of independent modules in a row, where each module contains N number of springs in a column i.e. total number of springs is M×N;
(b) An auxiliary hydraulic mechanism which aids in the pre-loading of each module to its fraction (1/M) of the total load;
(c) An integrated hydraulic jack system used to facilitate in transferring the total load from the LLVS to the supported load.

A common load bearing plate or load flange at the top of the system is supported by M×N numbers of springs. Evenly distributed hydraulic jacks, placed between fixed and movable plates at the front and the back of the LLVS aid in achieving the load/unload condition that is otherwise impractical by human power. Although design requirements vary depending upon specific application and load range, Variability factor, geometric restrains and maximum deflection criteria are a few of the common requirements. Variability Factor (VF) is defined as VF=(Spring Rate×Spring Deflection)/(Operating Load). As per MSS, VF<0.25. Site conditions and space availability impose geometric constraints the design of the LLVS. Maximum Deflection Criteria require that, under full compression, the spring should not reach the solid height (bottom out). To avoid such condition, built-in travel stops are required.

In the current invention the concept of the modular design of a set of spring and the application of the hydraulic jacking systems are unique and have not been utilized previously.

BRIEF DESCRIPTION OF THE DRAWINGS

FIG. 4 illustrates a section view of the invention along line 4-4 in FIG. 2 with the auxiliary hydraulic jacking system according to the present invention.

FIG. 5 illustrates another section view of the invention along 4-4 with the auxiliary hydraulic jacking system in an active state.

FIG. 6 illustrates another section view with travel stop lock nut repositioned against fixed top bar.

FIG. 7 illustrates another section view but with the invention in the locked position after repositioning of travel stop lock nuts FIG. 8 illustrates another section view with the integrated hydraulic jacking system according to the present invention FIG. 9 illustrates another section view with the integrated hydraulic jacking system according to the present invention in an active state creating displacement between fixed top bar and travel stop lock nut FIG. 10 illustrates another section view with the integrated hydraulic jacking system according to the present invention with the travel stop lock nut repositioned against fixed top bar.

FIG. 11 illustrates another section view with the integrated hydraulic jacking system according to the present invention removed and the present invention supporting a variable load.

DETAILED DESCRIPTION OF THE INVENTION

Figure 2:
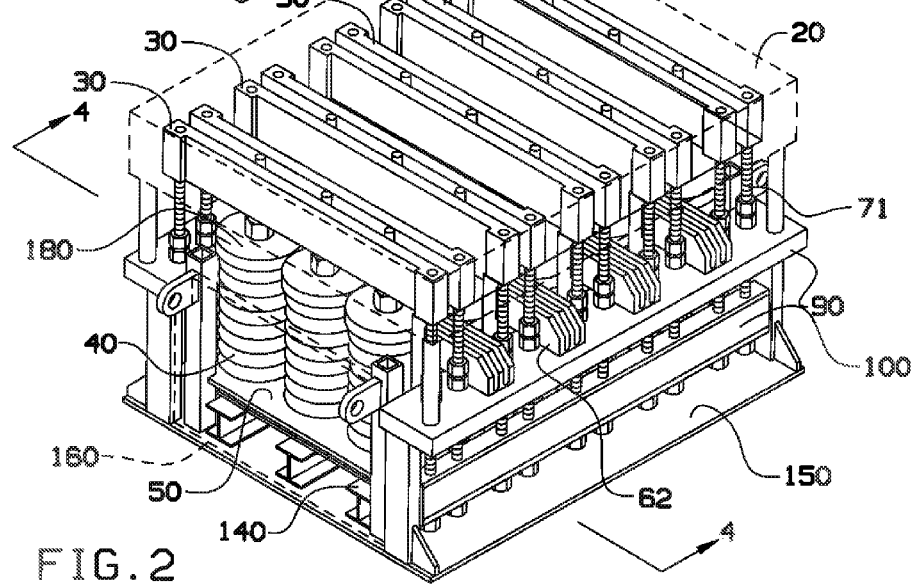
FIG. 2 illustrates a perspective view of the invention with multiple components in phantom for illustrative clarity.
Figure 3:
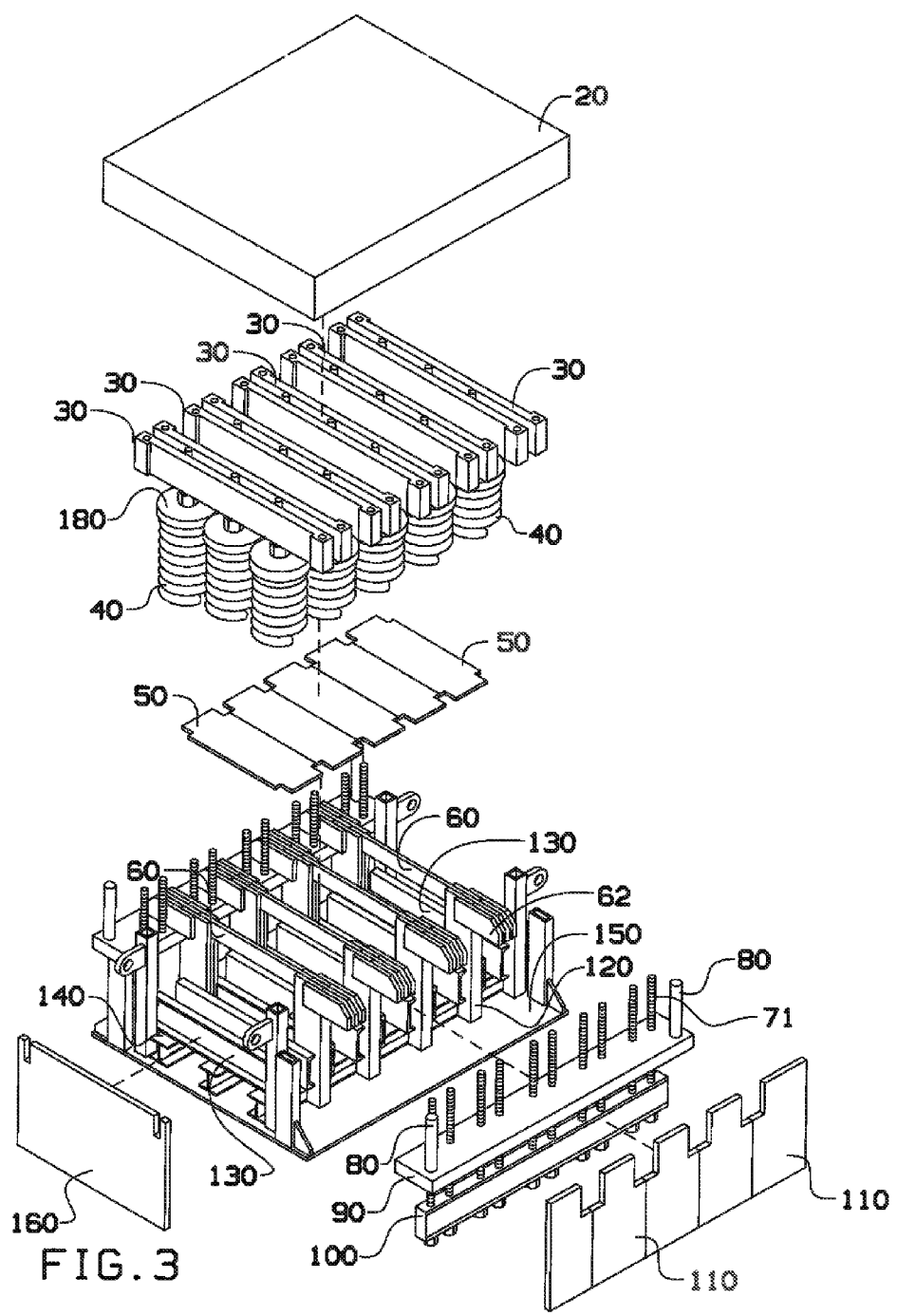
FIG. 3 illustrates an exploded view of the invention.
Figure 12:
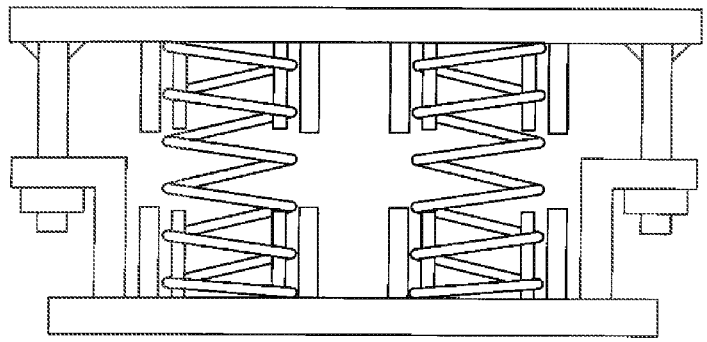
FIGS. 12-14 depict prior art devices.
Figure 13:
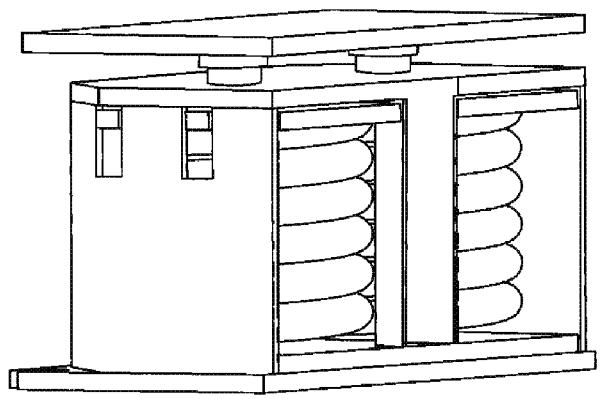
Figure 14:
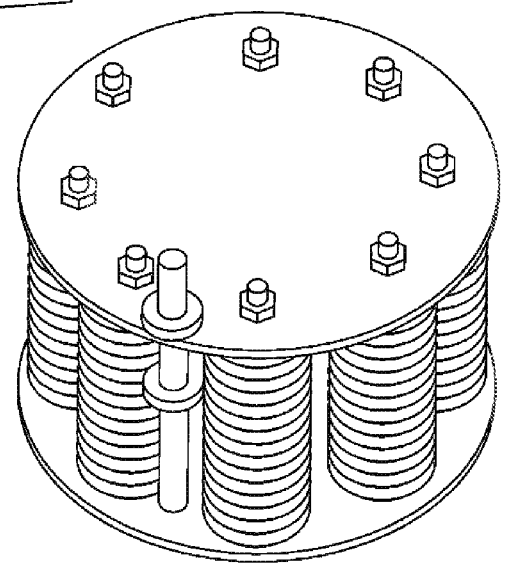

FIG. 3 shows a three-dimensional exploded perspective view of the current invention of the Large Load Variable Spring 10, which is comprised of a stationary structure frame including, spring base 50, cross beams 60, cantilever plates 62, fixed top bars 90, vertical columns 120, channels 130, I-beams 140 and base plate 150 while moving parts include load flange 20, spring bars 30, spring coils 40, stop rods 71, spring rods 170, upper spring rod nuts 171, lower spring rod nuts 172, spring pressure plates 180 and floating bars 100. The details of the stationary structure are best viewed in FIGS. 2 and 3 while those of the moving parts are best viewed in any of FIGS. 4-11.

Figure 1:
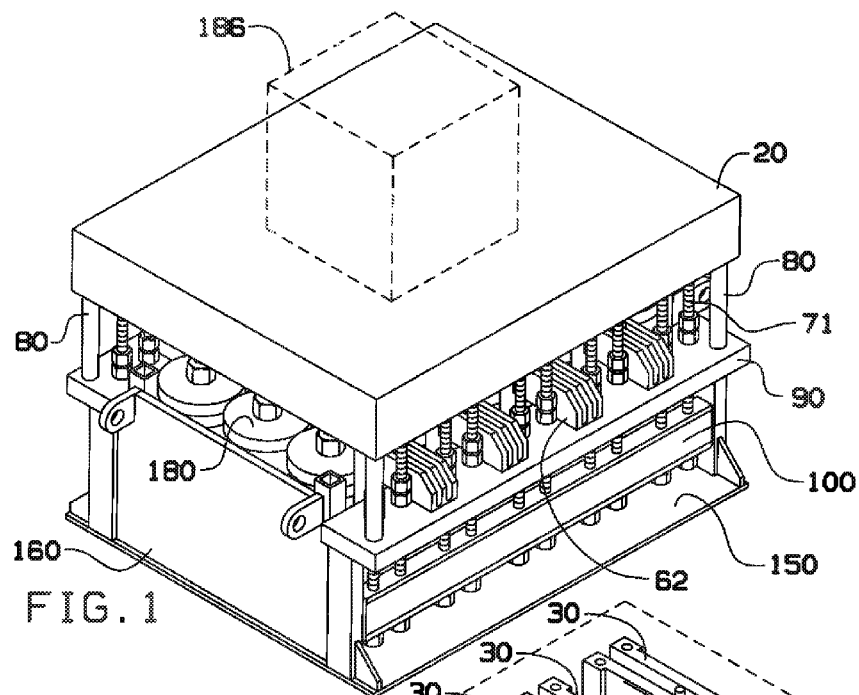
FIG. 1 illustrates an exemplary perspective view of the invention.

In the embodiment depicted in FIGS. 1-11, and with particular reference to FIGS. 1-3, five spring modules are arranged parallel to one another extending in a first direction on base plate 150 and comprise three spring coils 40 arranged in rows extending in a second direction. In this way a 5×3 spring matrix is formed consisting of 15 spring coils. Generally, the number of modules will be designated as M and the number of spring coils as N. Arranging these modules and springs in a matrix as shown yields M×N spring coils. While the embodiment of FIGS. 1-11 depicts a 5×3 spring coil matrix, the present invention is not limited to these specific numbers. The values of M & N will vary to match specific design requirements depending upon the load, spring rate, availability of space in all three directions, variability factor, geometric restraints and maximum deflection criteria as stated above.

In general, the base of any LLVS is established using structural steel components onto which the spring coils 40 will be positioned. The size, shape and quantity of these structural members should be adequate to support the design load and position the base of the spring coils 40 at the proper height. In this particular design, the base plate 150 supports I-beams 140 and channels 130 upon which the spring base 50 is supported.

The upper portion of the fixed frame provides support for travel stops. In the embodiment of FIGS. 1-11, this support is achieved by the four frame subassemblies best viewed in FIGS. 1-3 which comprise fixed cross beams 60 welded to vertical columns 120. The bottoms of vertical columns 120 are welded to base plate 150 and are strengthened by welded gussets. Cantilever plates 62 are affixed at the top of vertical columns 120 to establish the position of fixed top bar 90. Two fixed top bars 90, one at the front and one at the back end of fixed cross beams 60, are welded to the bottom surface of the cantilever plates 62. Each of the two fixed top bars 90 has 2×M (2×5 in the embodiment shown) number of through holes 72 to accept travel stop rods 71. Through-holes 72 allow for translation of stop rods 71 freely relative to the fixed top bars 90 in a direction along the longitudinal axis of the stop rods 71 while offering constrained motion in horizontal directions. Travel stop rods 71 are threadably affixed at their superior ends to spring bars 30.

As shown in FIGS. 1 and 3, the front plates 110 and side plates 160 cover the internal parts of the large load variable spring 10.

Moving components are designed so that the overall height of LLVS 10 conforms to the design requirements, so that load flange 20 can move without interference in the vertical direction and so that the supported load can be adequately transferred from the load flange 20 through the spring coils 40 to the stationary frame. Spring coils 40 sit on the spring base 50 and are confined between spring bar 30 and floating bar 100 by threaded travel stop rods 71. Load flange 20 rests on top of spring bar 30 while load flange guides 80 maintain stability and alignment of load flange 20. Flange guides 80 are preferably securely attached to the underside surface of load flange 20. With load flange 20 resting on spring bars 30, flange guides 80 are received by through-holes formed in fixed top bar 90 near the distal ends. By engagement of flange guides 80 with these through-holes, flange guides 80, and thereby load flange 20, are permitted to move in a vertical direction but are constrained by the diameter of the through-holes in horizontal directions. In some embodiments it may be desirable to provide one or more bearing elements inside the distal through holes.

The spatial relationship between spring bar 30 and spring coil 40 is established because upper spring rod nut 171 is welded to spring bar 30 whereas lower spring rod nut 172, which is not welded, can be positioned at any point along the threaded portion of spring rod 170. The spring coil 40 is thus confined between spring base 50 and spring pressure plate 180 positioned by lower spring rod nut 172. Fine adjustments to the height of spring coils within a given module may be made by threading of lower spring rod nut 172 along spring rod 170 in one direction or the other along.

Establishment of the Initial (Cold) Load

FIGS. 4-6 illustrate a section view along 4-4 of FIG. 2, showing one of the spring modules with an auxiliary hydraulic jack 184 prior to establishment of the installation/cold load. In this state, spring coils 40 are at their free length with no compression. Auxiliary hydraulic jack system 184 is then utilized to apply a load of "3 F" as shown in FIGS. 4 and 5 to a top surface of spring bar 30 to compress coils 40. The application of the force "3 F" causes a displacement of all spring coils within the module to a prescribed displacement "δ". At this position, the fraction of the total installation load supported at the module is attained and travel stop lock nuts 188 are spaced from fixed top bar 90 in a downward vertical direction as depicted in FIG. 5. To maintain this established compression of spring coils 40, travel stop lock nuts 188 are subsequently tightened against the lower surface of fixed top bar 90 to prevent relative vertical upward movement of lock rods 71 relative to fixed top bar 90 as in FIG. 6. Because of the fixed attachment of lock rods 71 to spring bars 30, spring bars 30 are also prevented from vertical upward movement and thereby lock spring coils 40 in this compressed, installation load state. Once stop lock nuts 188 are tightened against fixed top bar 90, auxiliary hydraulic jacking 184 is removed as shown in FIG. 7. This process is repeated to each spring module until all of the modules have been set to the prescribed height so that the total installation load can be established.

Transfer of the Installation Load to the Supported Component

To unlock LLVS 10 from its installation load and transfer the installation load to a large variable load 186, an integrated hydraulic jacking system 182 is used as shown in FIGS. 8-10. When unlocking the LLVS, the hydraulic jacks of system 182 are positioned under the fixed top bar 90 and above the floating bar 100 as in FIG. 8. The size and quantity of the hydraulic jacks must be adequate to LLVS load range. Sufficient pressure is applied at the jacks to produce a load slightly higher than the installation load established earlier. This jack load will produce another displacement "δ" of the floating bar 100 as shown in FIG. 9 to move stop rods 71 vertically downward. The vertical downward movement of stop rods 71, in turn, causes a displacement of travel stop lock nuts 188 which are threadably fastened to stop rods 71. The resulting displacement of stop lock nuts 188 from fixed plate 90 is visible in FIG. 9. With this displacement, the travel stop nut 188 can easily be relocated by loosening to a position away from the fixed top bar 90 as viewed in FIG. 10. The final position of the travel stop nut 188 is determined by the theoretical displacement of the load flange 20 under load 186. After all of the travel stop nuts 188 have been relocated, integrated hydraulic jacking system 182 is disengaged to allow the installation load to be transferred from the LLVS to a supported load 186 such as piping, equipment, etc as shown in FIG. 11.

The above-described embodiments of the invention are presented for purposes of illustration and not of limitation. Let it be understood that the steps disclosed may be performed in a different order and remain within the scope of the present invention.

We claim:

1. A large load variable spring support, comprising:
   a base plate;
   a plurality of spring modules assembled into a spring module array disposed on said base plate;
   at least one fixed top bar fixedly connected to said base plate by vertical columns;
   a plurality of through-holes provided in said fixed top bar;
   a plurality of stop rods with top and bottom ends, said stop rods being slidably received in said through-holes of said fixed top bar;
   a floating bar slidably received on said plurality of stop rods at said bottom ends and supported by a plurality of floating bar nuts near said bottom ends of said plurality of stop rods, wherein rotation of said floating bar nuts in a first direction causes advancement of said floating bar nuts along said stop rods in a first vertical direction and rotation of said floating bar nuts in a second direction causes advancement of said floating bar nuts along said stop rods in a second direction and wherein said floating bar supported by said floating bar nuts will advance as said floating bar nuts advance;

a plurality of cross beams supported at opposing distal ends by said vertical columns and having cantilever plates at said distal ends, wherein said plurality of cross beams are fixedly connected to said at least one fixed top bar at said cantilever plates; and a plurality of travel stop lock nuts threadably engaged with said stop rods such that said stop lock nuts engage a bottom surface of said fixed top bar to prevent vertical upward movement of said stop rods and maintain said spring modules in a compressed position.

2. The large load variable spring support of claim 1, wherein each of said plurality of spring modules further comprise:
a plurality of spring coils having top and bottom ends;
a spring bar having one through hole for each of said plurality of spring coils;
one spring rod disposed in each of said through holes and having a lower spring nut threadably attached thereto near said spring bar;
wherein said spring rod is threadably engaged with an upper spring nut fixedly attached to said spring bar;
one spring pressure plate between said spring coil and said lower spring nut; and a spring base at the base of said plurality of spring coils.

3. The large load variable spring support of claim 2, further comprising:
a load flange supported by said plurality of spring bars wherein a load placed upon
said load flange causes said load flange to pressure said spring bars in a downward
vertical direction which, in turn, depresses spring coils via said spring pressure plates;
and wherein downward vertical movement of said spring bars also causes downward vertical movement of said stop rods and thus said floating bar.

4. The large load variable spring support of claim 2, wherein said spring modules further comprise:
a plurality of spring rods threaded to upper spring rod nuts fixedly attached to said spring bars; and
a plurality of lower spring rod nuts threadably attached to said plurality of spring rods such that rotation of said lower spring nuts in a first direction causes one vertical movement of said springs nuts along said spring rods and rotation of said lower spring nuts in a second direction causes a second vertical movement of said spring nuts along said spring rods to a point where said spring nuts engage said spring pressure plates to cause a compression of one of said spring coils associated with said spring rod.

5. The large load variable spring support of claim 3, wherein:
said plurality of stop rods are fixedly connected at top ends to said spring bar such that vertical movement of said spring bars also causes a vertical movement of said stop rods.

6. The large load variable spring support of claim 5, further comprising:
a plurality of flange guides fixedly connected to said load flange and slidably disposed in a second plurality of through holes formed in said fixed top bar such that said flange guides and thus said load flange are capable of moving in vertical directions but said flange guides and thus said load flange are prevented from substantial horizontal movement by the deposition of said flange guides in said second plurality of through-holes.

7. A method of locking a cold load into a large load variable spring support, said method comprising:
applying, via an auxiliary hydraulic jack, a force to a spring module at a spring bar to cause a compression of spring coils supporting said spring bar and to cause vertical downward travel of a plurality of stop rods in a plurality of through holes formed in a fixed top bar;
wherein applying said force further causes travel of stop lock nuts threadably engaged with said stop rods to move vertically downward with said rods in a direction away from said fixed top bar;
rotating said stop lock nut in a first direction to cause travel of said stop lock nut relative to said stop rod in a vertical upward direction toward said fixed top bar to engage said fixed top bar on a bottom surface thereof thus locking spring coils in a compressed position.

8. The method of locking as set forth in claim 7, further comprising;
repeating said applying and rotating steps a number of times equal to the total number of spring modules within said large load variable spring support.

9. A method of unlocking a plurality of spring modules that are part of a large load variable spring support, said method comprising:
applying, via an integrated hydraulic jacking system, a force to a load flange and there through a plurality of spring coils of said spring modules to cause a compression of said spring coils that support a spring bar and to cause vertical downward travel of a plurality of stop rods in a plurality of through holes formed in a fixed top bar;
wherein downward travel of said plurality of stop rods further causes travel of stop lock nuts threadably engaged with said stop rods to move vertically downward with said rods in a direction away from said fixed top bar;
rotating said stop lock nuts in a first direction to cause travel of said stop lock nuts relative to said stop rods in a vertical downward direction from a first position engaged with a bottom surface of said fixed top bar to a second position away from said fixed top bar;
transferring a force locked into the compression of said spring coils to a large load supported by a load flange.

10. The method of unlocking as set forth in claim 9, wherein:
by said rotating step, unloaded spring coils are allowed to extend slightly to a new position constrained by the engagement of said stop lock nuts in said second position with said bottom surface of said fixed bar.

* * * * *